United States Patent [19]

Jang

[11] Patent Number: 5,719,767
[45] Date of Patent: Feb. 17, 1998

[54] APPARATUS FOR NOTIFYING THE POSSIBILITY OF A MALFUNCTION OF AN AUTOMATIC TRANSMISSION AND METHOD THEREFOR

[75] Inventor: Chang-Euk Jang, Kyongsangnam-do, Rep. of Korea

[73] Assignee: Hyundai Motor Company, Seoul, Rep. of Korea

[21] Appl. No.: 508,076

[22] Filed: Jul. 27, 1995

[30] Foreign Application Priority Data

Jul. 29, 1994 [KR] Rep. of Korea .............. 94-18686

[51] Int. Cl.$^6$ .................................................. B60K 41/06
[52] U.S. Cl. .......................... 364/424.091; 364/424.034; 340/438; 477/34
[58] Field of Search ................. 364/424.08, 424.091, 364/424.093, 424.095, 424.034, 550; 340/438; 477/34

[56] References Cited

U.S. PATENT DOCUMENTS

| | | | |
|---|---|---|---|
| 5,133,231 | 7/1992 | Goto et al. ................... | 477/150 |
| 5,140,871 | 8/1992 | Goto et al. ................... | 364/424.08 |
| 5,163,342 | 11/1992 | Pollack et al. ............... | 477/150 |
| 5,168,777 | 12/1992 | Isono et al. .................. | 477/152 |
| 5,182,970 | 2/1993 | Goto et al. ................... | 477/151 |
| 5,219,391 | 6/1993 | Edelen et al. ................ | 364/424.089 |
| 5,251,509 | 10/1993 | Pollack et al. ............... | 364/424.087 |
| 5,289,741 | 3/1994 | Debs et al. ................... | 364/424.091 |
| 5,434,779 | 7/1995 | Vukovich et al. ............ | 364/424.087 |

FOREIGN PATENT DOCUMENTS 9330286  7/1995  Rep. of Korea .

*Primary Examiner*—Collin W. Park

[57] ABSTRACT

Disclosed is an apparatus for notifying the possibility of a malfunction of an automatic transmission, which includes a throttle valve sensor for detecting the degree of the throttle valve's opening to generate a throttle valve signal, a shift valve sensor for detecting the on/off state of the two shift valves to generate a .shift valve signal, a rotation number evaluation device for evaluating the number of the rotations of the transmission input and the transmission output shaft to generate a rotation number evaluation signal, a control circuit for first obtaining the standard distribution of the shifting time of all the shifts in the normal operation of the transmission to establish a plurality of error levels, second obtaining the distribution of the shifting time of the present shifts, and comparing the second obtained distribution with the error levels so as to generate a warning signal in abnormal operation of said transmission, and a warning means for displaying the possibility of the malfunction together with a possible malfunction code indicating a particular shifting mode according to the warning signal.

14 Claims, 4 Drawing Sheets

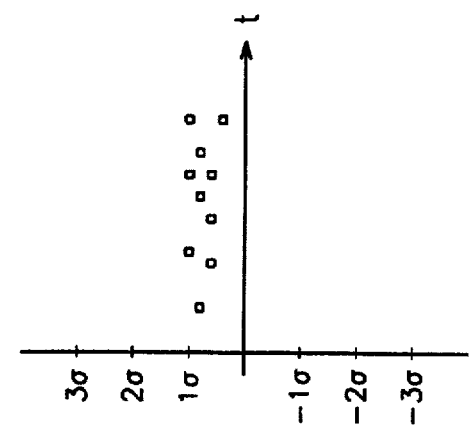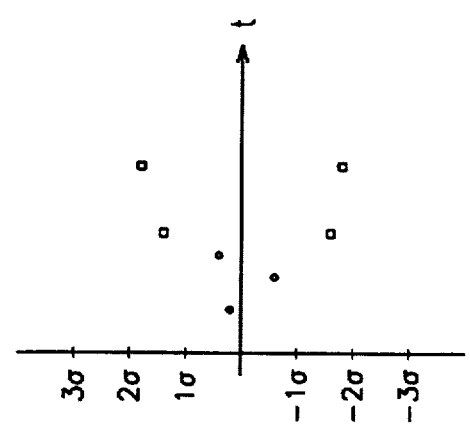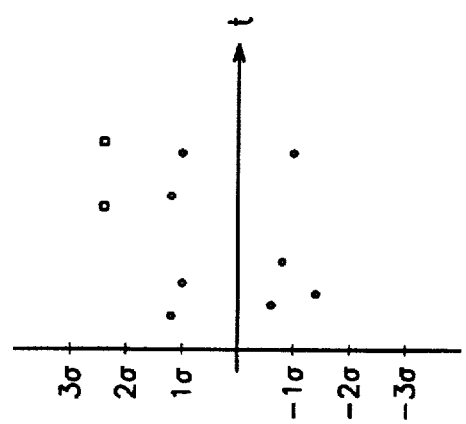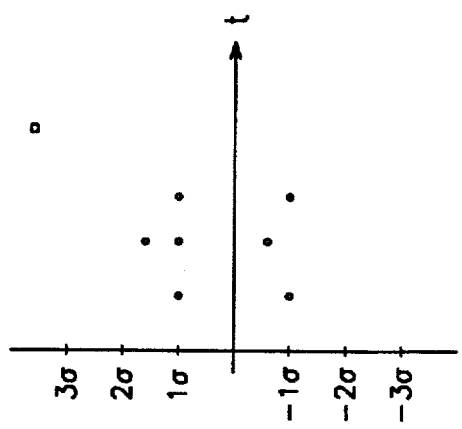

APPARATUS FOR NOTIFYING THE POSSIBILITY OF A MALFUNCTION OF AN AUTOMATIC TRANSMISSION AND METHOD THEREFOR

BACKGROUND OF THE INVENTION

1. Field of the Invention

The present invention concerns an apparatus for notifying the possibility of a malfunction of an automatic transmission and method thereof.

2. Description of Related Art

The automatic transmission provides the necessary gear ratios to operate the vehicle under a wide range of speeds and loads. It does this with a minimum amount of effort on the part of the driver. Upshifts occur smoothly and automatically, as do downshifts. Generally, the shifting time of the automatic transmission during which a gear shift is made is affected by the responsiveness and the clearance of the component parts, the wearing of the clutches and brakes, and the fluid condition of the transmission oil such as viscosity, contamination, etc. Hence, the measuring of the shifting time leads us to an index of the possibility of a malfunction occurring in the transmission. To catch the possibility of a malfunction during working of the transmission is very important to avoid the dangerous situations that may occur during vehicle driving. The Korean Patent Application No. 93-30286 filed on Dec. 28, 1993 entitled as "Apparatus For Notifying The possibility Of A Malfunction Of An Automatic Transmission And Method Of Controlling It" discloses that the distribution of the shifting time of the present shifts currently evaluated is compared with the standard distribution of the shifting time of all the shifts evaluated in the normal operation of the transmission. In this case, if the distribution of the shifting time currently evaluated goes beyond the standard distribution, a warning signal is generated to warn of the possibility of a malfunction of the transmission.

SUMMARY OF THE INVENTION

It is an object of the present invention to provide an apparatus for notifying the possibility of a malfunction of an automatic transmission and method thereof, which employs the standard distribution of the shifting time of all the shifts in the normal operation of the transmission to generate a warning signal for indicating the malfunction.

According to an embodiment of the present invention, an apparatus for notifying the possibility of a malfunction of an automatic transmission comprises:

- a throttle valve sensor for detecting the degree of the throttle valve's opening to generate a throttle valve signal;
- two shift control solenoid valves(SCSV) driven by the transmission control unit (TCU) to select appropriate gear position;
- two rotation speed evaluation devices for evaluating the speed of the rotations of the transmission input and the transmission output shaft;
- a control circuit for first obtaining the standard distribution of the shifting time of all the shifts in the normal operation of the transmission to establish a plurality of normal error levels, second obtaining the distribution of the shifting time of the present shifts, and comparing the second obtained distribution with the error levels so as to generate a warning signal in abnormal operation of said transmission; and
- a warning means for displaying the possibility of the malfunction together with a suspected malfunction code indicating a particular shifting mode.

According to another embodiment of the present invention, a method for notifying the possibility of a malfunction of an automatic transmission comprises the steps of:

- deciding whether said transmission works in the normal operating condition or not;
- first evaluating the standard distribution of the shifting time of all the shifts in the normal operating condition to obtain the standard deviation thereof stored into an EEPROM( Electronically Erasable & Programmable ROM;
- second evaluating the distribution of the shifting time of the present shifts;
- comparing the second evaluated distribution with the standard deviation to generate a warning signal in the abnormal operating condition of the transmission; and
- displaying the possibility of the malfunction together with a possible malfunction code indicating a particular shifting mode according to the warning signal with a lamp.

The present invention will now be described more specifically with reference to the drawings attached only by way of example.

BRIEF DESCRIPTION OF THE ATTACHED DRAWINGS

FIGS. 3A, 3B, 3C and 3D are graphs for illustrating the distribution of the shifting time of the present shifts compared with the standard deviation of the standard distribution of the shifting time of all the shifts evaluated in the normal operating condition according to the present invention;

DETAILED DESCRIPTION OF THE PREFERRED EMBODIMENTS

Figure 1:
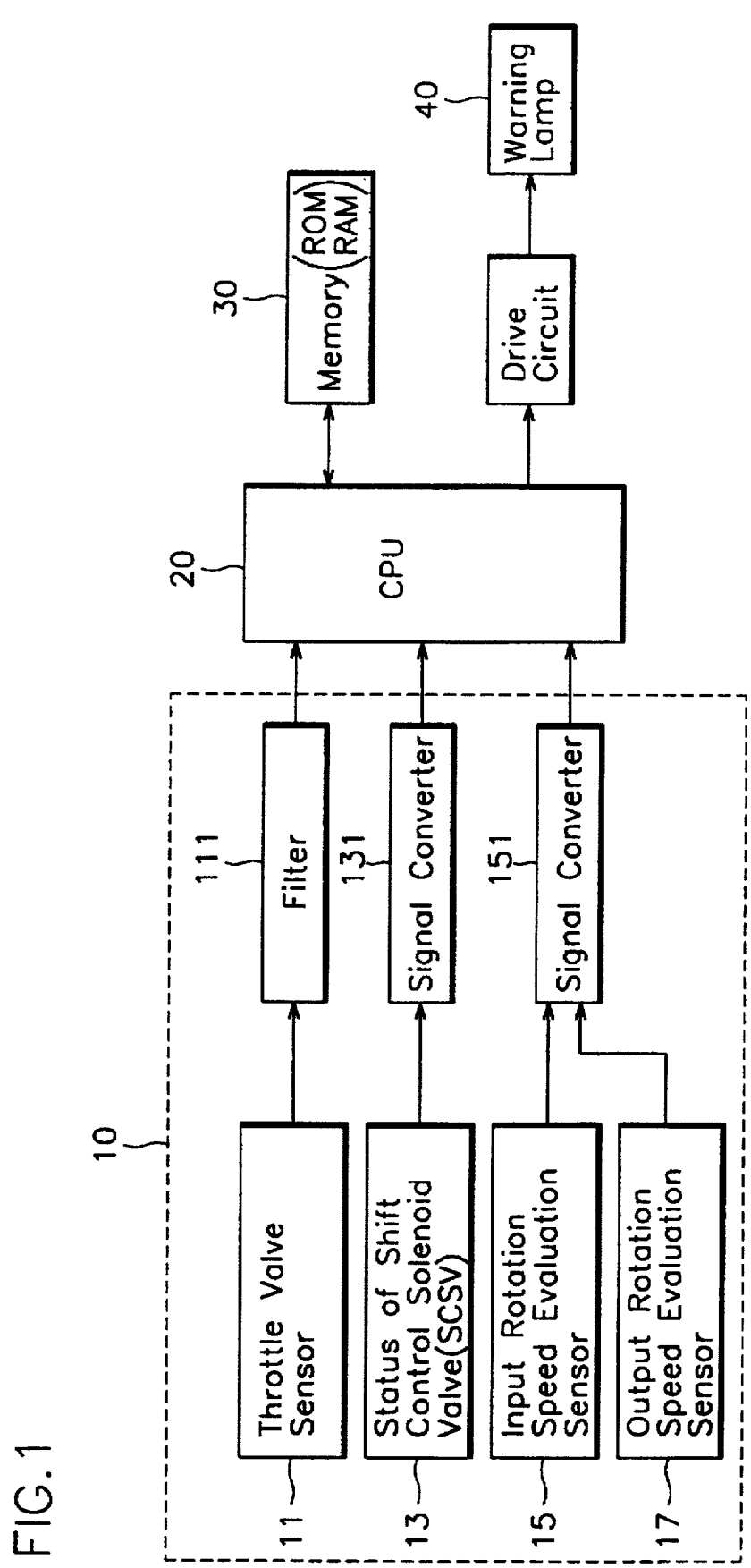
FIG. 1 is a block diagram for conceptually showing an apparatus for notifying the possibility of a malfunction of the transmission according to the present invention.

Referring to FIG. 1, an apparatus for notifying the possibility of a malfunction of the transmission includes an evaluation circuit 10 for detecting the amount of the throttle valve's opening, shift valve's on/off and transmission's input/output rotations. The output signal of the evaluation circuit 10 is transferred to a CPU 20. Further included are a memory 30 and a warning lamp 40 and a drive circuit 50 for the warning lamp.

The evaluation circuit 10 includes a throttle valve sensor 11 for detecting the degree of the throttle valve's opening to generate a throttle valve signal, two SCSVs 13 for detecting the current position of the gear which is determined by the on/off status of the SCSVs, and a rotation speed evaluation device 15, 17 for detecting the speed of the rotations of the transmission input and the transmission output shaft. The rotation speed detection device consists of a rotation speed detection sensor 15 for detecting the speed of the rotations of the transmission input and an output rotation speed evaluation sensor 17 for detecting the number of the rotations of the transmission output. The output signal of the throttle valve sensor 11 is transferred via a filter 111 to the control circuit 20. The output signal of the shift valve sensor 13 is transferred via a signal converter 131 to the control circuit 20. The output signals of the rotation speed detection device are transferred via a signal converter 151 to the control circuit 20. The signal converter converts alternative current to squarewave.

Figure 4:
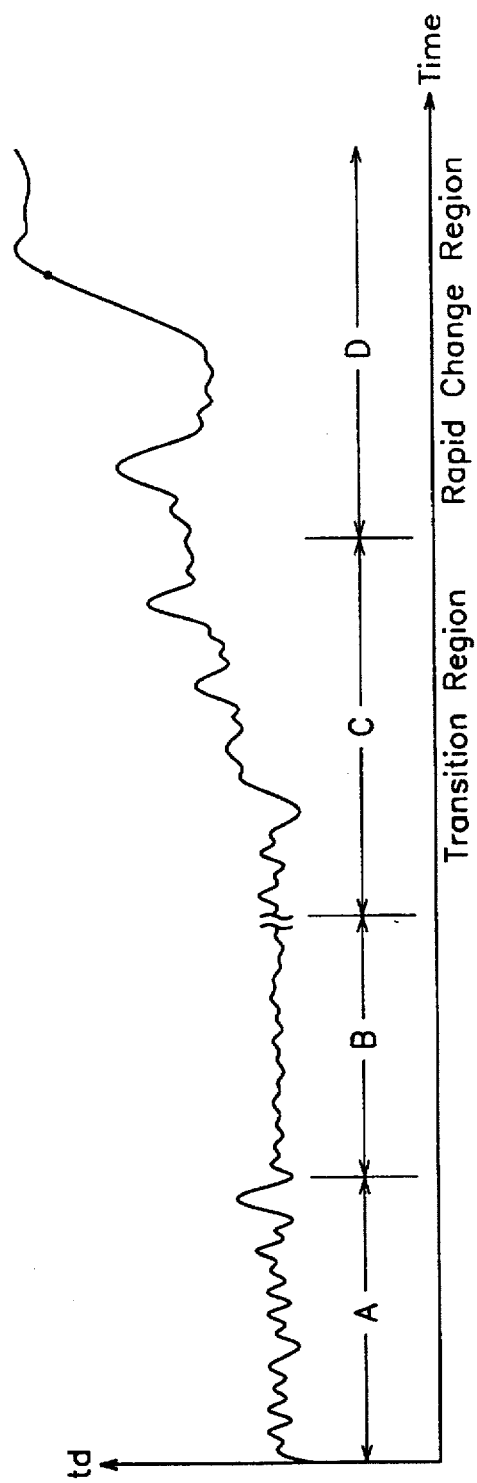
FIG. 4 illustrates the trend of the shift time of the transmission.

The trend of shift time characteristics of the transmission in operation are shown in FIG. 4, where the irregularity of the responsiveness in the first unstable duration A is caused by the initial abrasion of the component parts. In the stable duration B is shown fairly uniform response characteristics. Then, the characteristics are gradually degraded through the transition duration C to the rapid change region D, where they experience a rapid change indicating a malfunction of the transmission.

In order to obtain a distribution of the shifting time during which the gear shifts are made, we need first classify the shifts into six cases identified by six codes and the degrees of the throttle valve's opening also into six cases identified by six codes. These codes are combined to results in thirty-six cases of shifts. The shift and the throttle codes are respectively represented in the following tables 1 and 2.

TABLE 1

| Shift Code No. | Shift Method |
|---|---|
| 1 | 1 → 2 |
| 2 | 2 → 3 |
| 3 | 3 → 4 |
| 4 | 4 → 3 |
| 5 | 3 → 2 |
| 6 | 2 → 1 |

TABLE 2

| Throttle Code No. | Degree of Throttle Valve's Opening |
|---|---|
| 1 | 0–30 |
| 2 | 30–40 |
| 3 | 40–50 |
| 4 | 50–60 |
| 5 | 60–70 |
| 6 | 70–100 |

The shifting time differs from one gear shift to another, and therefore must be measured for each case and compared under the same gear shift. Further, the shifting time increases with the degree of the throttle valve's opening, and therefore must be measured and compared under the same opening degree. Referring to Tables 1 and 2, for example, when the gear shift is made from the first speed to the second speed and the degree of the throttle valve's opening 30–40%, then the combination of the codes for indicating the shifting state is represented by the code "12". Thus there may be produced thirty-six combinations of code. The measuring of the shifting time is carried out for each of the thirty-six cases and compared independently under the same condition.

Figure 2:
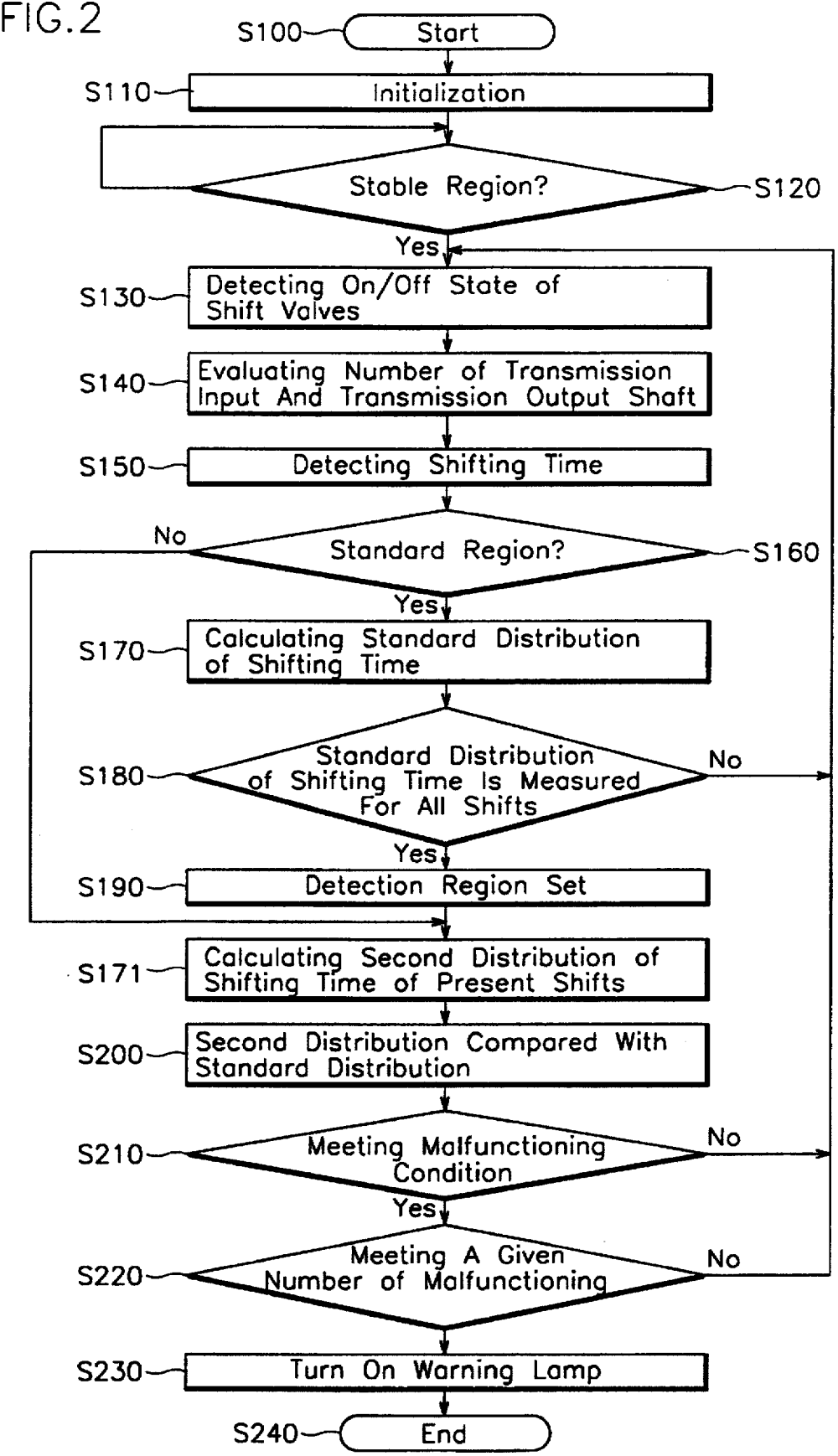
FIG. 2 is a flow chart for showing the method for obtaining the judgement to notify the possibility of the malfunction of the transmission according to the present invention.

If the vehicle is initially applied with a power supply, the control circuit 20 is initialized in step S110 (refer to FIG. 2), and then makes a decision whether the responsive characteristics of the transmission lie in the stable region in step S120. For example, a shift is generally regarded as being made in the stable region after the shift from the second speed to the third speed has been carried out over about 500 times.

The throttle valve sensor 11 of the evaluation circuit 10 detects the degree of the throttle opening to generate a throttle valve signal applied via the first filter 111 to the control circuit 20. The throttle valve is connected via a link with the acceleration pedal so that the degree of the throttle valve relies on the working of the acceleration pedal. The shift valve sensor 13 detects the on/off state of the two shift valves to generate a shift valve signal applied via the signal converter 131 to the control circuit 20, in step S130. The on/off state of the two shift valves depends on the shift stage determined by the degree of the throttle valve. The signal converter 131 is to convert the shift valve signal into a digital form. In step S140, the input rotation number evaluation sensor 15 detects the number of the rotations of the transmission input to generate an input rotation number signal applied via the signal converter 151 to the control circuit 20. The output rotation speed evaluation sensor 17 detects the speed of the rotations of the transmission output to generate an output rotation speed signal applied via the signal converter 151 to the CPU 20.

The classification of shifts is determined by detecting the on/off state of the first and the second SCSV. If the shift code Nos. 1 and 2 are detected over a given number of times, i.e.: 500 times, it is determined that the initially unstable region has been passed. Generally, if the shift from the first speed to the second speed or from the third speed to the fourth speed are carried out over 500 times, it is determined that the initially unstable region has been passed.

Figure 5:
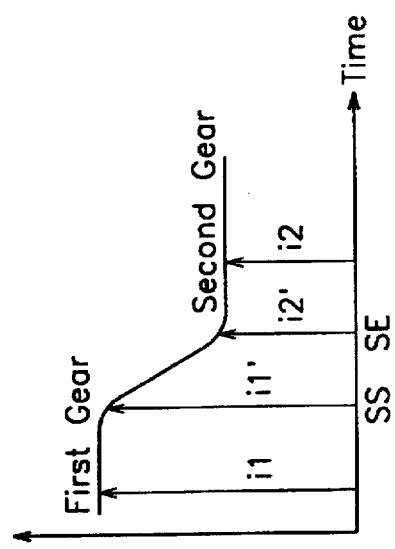
FIG. 5 is a graph for illustrating the speed ratio between the input and output shaft.

After the initially unstable region has been passed, the ratio between the speed of the rotations of the transmission output shaft is calculated to compare with one of the fixed values respectively representing the gear ratio. Every fixed values is the ratio between the speed of the rotations of the transmission input shaft and the speed of the rotations of the transmission output shaft when the corresponding gear shift has been completed. In other words, while a gear shift is being made, the speed ratio of input and output shaft is not kept constant but changed to one of the fixed values after a given time. For example, if it is assumed that the fixed value for the second gear is 1.5, the on/off state indicates the first shift stage, and the ratio is not 1.5, then it is determined that the shift operation of the transmission has not yet been completed. Shift time is the time measured from the point SS and to the point SE shown on FIG. 5. At SS point, the speed ratio reach the 110% of i2.

Thus, if the transmission works in the standard region in step S160, the shifting time taken from one gear to another for each of the 36 cases is obtained to produce the standard distribution of the shifting time of all the shifts in step S170. When it is determined in step S170 that the standard distribution of the shifting time of all the shifts is obtained, a detection region is set so as to establish a plurality of error levels in step S190. The standard deviation σ of the standard distribution is calculated so as to establish four regions of error level, which are shown in FIGS. 3A, 3B, 3C and 3D. Three limits are specified respectively having the values of σ, 2σ and 3σ.

Meanwhile, if the transmission does not work in the standard region in step S160, the shifting time taken from one gear to another for each of the 36 cases is obtained to produce a second distribution of the shifting time of the present shifts in step S171, which, in step S210, is compared with the standard deviation to decide that the possibility of a malfunction is the highest if the second distribution, in step S220, meets a given number of the following malfunctioning conditions:

1. When at least one Of the second distribution data is beyond three times the standard deviation ±3σ as shown in FIG. 3A.
2. When at least two of the second distribution data are beyond two times the standard deviation ±2σ as shown in FIG. 3B.
3. When at least four of the second distribution data are beyond the standard deviation ±σ as shown in FIG. 3C.
4. When all of the second distribution data exist only in one side of the standard deviation as shown in FIG. 3D.

In one embodiment of the present invention, if the second distribution of the shifting time for the shift code No. 1 meets three or more of the malfunctioning conditions, it is determined that malfunctioning of the transmission is about to take place. The number of the malfunctioning conditions upon which the determination of malfunction is based may be determined through experimentation. In this case, it is noted that the external noises or disturbances may cause the second distribution to meet some of the malfunctioning conditions even at the normal operation of the transmission. Hence, the number of the malfunctioning conditions upon which the determination of malfunction is based should not be too small in order to increase the reliability of the apparatus.

Thus, if it is detected that the second distribution meets a predetermined number of the malfunctioning conditions, the control circuit 20 in step S230 drives the warning display 40 to warn of the possibility of the malfunction together with displaying a malfunction code for indicating the shift mode where the malfunction may occur. It is preferable to warm up the warning display in order to display its electrical lines having no abnormal cut or short and the intervals between the codes. The time during which the warming up is performed is about three times longer than the time taken for displaying a malfunction code. If several malfunction codes are produced to indicate the malfunction occurring in several shift modes, the codes are sequentially displayed. The number of the codes sequentially displayed is preferably limited to six. The generated malfunction codes are stored in a memory of the control circuit 20 until the power of the battery is off.

What is claimed is:

1. In a powertrain comprising an engine having a throttle valve, and an automatic transmission connected to the engine and having two shift valves for changing a speed ratio of the transmission, an apparatus for identifying a possible malfunction in the automatic transmission, the apparatus comprising:

a throttle valve sensor constructed and arranged to detect a degree of opening of the throttle valve, and to generate a throttle valve signal corresponding to said detected degree of opening;

a rotation counter constructed and arranged to evaluate a number of rotations of both a transmission input and a transmission output, and to generate a speed ratio of said transmission input to said transmission output;

a control circuit constructed and arranged to:

obtain a first distribution of shifting times of shifts during a normal operation of said transmission, wherein shifting time corresponds to a change in said speed ratio relative to an elapsed time and said throttle valve signal indicating said detected degree of valve opening;

obtain a second distribution of shifting times of shifts during a predetermined time period;

obtain a standard deviation of said first distribution;

compare said second distribution with said standard deviation; and determine that a malfunction possibly exists in the transmission based on a comparison of said second distribution and said standard deviation; and warning means for indicating said possible malfunction.

2. The apparatus as claimed in claim 1, further comprising a shift valve sensor constructed and arranged to detect an on/off state of the two shift valves, and to generate respective shift valve signals corresponding to said detected on/off state of the shift valves, whereby a particular shifting state can be identified, wherein said normal operation of said transmission is measured according to a number of times that a certain shifting state occurs relative to a threshold number of occurrences.

3. The apparatus as claimed in claim 2, wherein said threshold number of occurrences is 500 times.

4. The apparatus as claimed in claim 1, wherein said control circuit is constructed and arranged to identify a specific type of malfunction and said warning means indicates said specific type of malfunction.

5. The apparatus as defined in claim 1, wherein said control circuit is constructed and arranged to identify that a malfunction possibly exists if at least one of the following conditions exists:

1) at least one datum of said second distribution data is more than three times said standard deviation ±3σ;
2) at least two data of said second distribution are more than two times said standard deviation ±2σ;
3) at least four data of said second distribution are beyond the standard deviation ±σ; and
4) all data of said second distribution are located one side of said standard deviation.

6. The apparatus as claimed in claim 5, wherein said control circuit is constructed and arranged to identify that a malfunction possibly exists if at least three of said conditions exist.

7. In a powertrain comprising an engine having a throttle valve, and an automatic transmission connected to the engine and having two shift valves for changing a speed ratio of the transmission, a method for identifying a possible malfunction in the automatic transmission, comprising the steps of:

deciding if the transmission is operating in a normal operating condition;

obtaining a first distribution of shifting times of shifts in the normal operating condition obtaining a standard deviation of said first distribution;

obtaining a second distribution of shifting times of shifts during a predetermined time period;

comparing the second distribution with the standard deviation;

identifying an abnormal operating condition of the automatic transmission in accordance with the comparison of the second distribution and the standard deviation; and indicating that a malfunction possibly exists, according to the identification of an abnormal operating condition.

8. The method as claimed in claim 7, wherein said identifying step identifies a specific abnormal operating condition and said indicating step includes a step of indicating a specific type of malfunction corresponding to the specific abnormal operating condition.

9. The method as claimed in claim 7, wherein said comparing step comprises a step of identifying if at least one of the following conditions exists:
1) at least one datum from the second distribution is more than three times the standard deviation ±3σ;
2) at least two data from the second distribution are more than two times the standard deviation ±2σ;
3) at least four data from the second distribution are more than the standard deviation ±σ; and
4) all of the data from the second distribution exist only on one side of the standard deviation.

10. The method as claimed in claim 9, wherein said comparing step comprises identifying if at least three of said conditions exist.

11. In a powertrain comprising an engine having a throttle valve, and an automatic transmission connected to the engine and having two shift valves for changing a speed ratio of the transmission, an apparatus for identifying a possible malfunction in the automatic transmission, the apparatus comprising:

means for sensing normal operation of the automatic transmission;

a control circuit constructed and arranged to:
obtain a first distribution of shifting times of shifts during said normal operation of said transmission;
establish a plurality of error levels according to said first distribution of shifting times;
obtain a second distribution of shifting times of shifts during a predetermined period of time; and
compare said second distribution with said error levels and generate a warning signal during an abnormal operation of said transmission, wherein said control circuit is constructed and arranged to calculate a standard deviation of said first distribution, and compare said second obtained distribution with said standard deviation to determine if a malfunction possibly exists; and warning means for indicating that a malfunction possibly exists.

12. The apparatus as claimed in claim 11, wherein said control circuit is constructed and arranged to determine if a specific malfunction possibly exists, and said warning means indicates said specific malfunction.

13. The apparatus as claimed in claim 11, wherein said means for sensing normal operation of the automatic transmission comprises a shift valve sensor constructed and arranged to detect an on/off state of the two shift valves, whereby a particular shifting state can be identified, and means for identifying whether a particular shifting state has occurred more than a threshold number of occurrences.

14. The apparatus as claimed in claim 13, wherein said threshold number of occurrences is 500 times.

* * * * *